United States Patent [19]

Hiramitsu et al.

[11] Patent Number: 4,796,482
[45] Date of Patent: Jan. 10, 1989

[54] STEERING WHEEL

[75] Inventors: Tetsushi Hiramitsu; Satoshi Ono; Atsuo Hirano, all of Aichi; Zenzaburo Murase, Konan, all of Japan

[73] Assignee: Toyoda Gosei Co., Ltd., Nishikasugai, Japan

[21] Appl. No.: 871,544

[22] Filed: Jun. 6, 1986

[30] Foreign Application Priority Data

| Jun. 10, 1985 | [JP] | Japan | 60-125761 |
| Jun. 10, 1985 | [JP] | Japan | 60-125762 |
| Aug. 29, 1985 | [JP] | Japan | 60-191612 |
| Apr. 16, 1986 | [JP] | Japan | 61-58165 |

[51] Int. Cl.$^4$ .............................................. B62D 1/16
[52] U.S. Cl. ................... 74/492; 74/484 R; 74/552; 200/61.54
[58] Field of Search ............ 74/492, 498, 484 R, 74/552, 409; 200/61.54

[56] References Cited

U.S. PATENT DOCUMENTS

| 2,397,126 | 3/1946 | Buhrendorf | 74/409 |
| 4,455,454 | 6/1984 | Umebayashi . | |
| 4,485,371 | 11/1984 | Yamada et al. | 200/61.54 |
| 4,561,324 | 12/1985 | Hiramitsu et al. | 74/498 |
| 4,598,603 | 7/1986 | Hiramitsu et al. | 74/492 |
| 4,602,523 | 7/1986 | Kurata et al. | 74/492 |
| 4,607,539 | 8/1986 | Arima et al. | 74/492 |

Primary Examiner—Kenneth J. Dorner
Assistant Examiner—Gerald A. Anderson
Attorney, Agent, or Firm—Cushman, Darby & Cushman

[57] ABSTRACT

The steering wheel comprises a column section, a steering shaft passing through the column section, a boss portion secured to the top of the steering shaft, a boss plate secured on the boss portion, a pad section, a plurality of sun gears of the helical gear type, a plurality of planetary shafts, a plurality of pairs of planetary gears of the helical gear type attached to either end portion each of the respective planetary shafts and gearing with the corresponding sun gears, and a resilient member for urging the planetary gears of a pair mounted on at least one of the plural planetary shafts. At least one of the paired planetary gears is attached movably in the longitudinal direction of the axis of that planetary shaft, so that these planetary gears approach mutually or separate from each other in the axial direction of the respective planetary shaft.

5 Claims, 11 Drawing Sheets

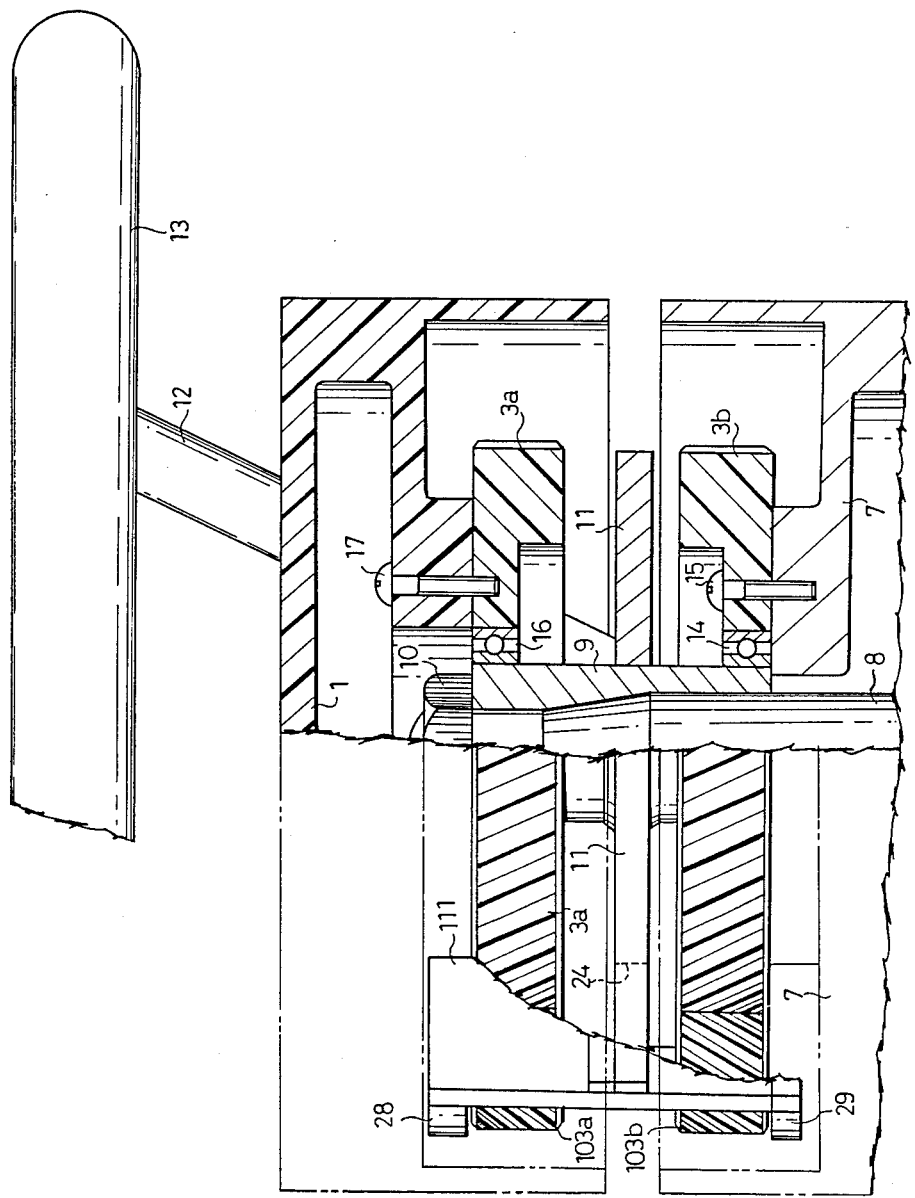

STEERING WHEEL

FIELD OF THE INVENTION

This invention relates to a steering wheel with a stationary pad with a sun and planetary gear mechanism.

DESCRIPTION OF THE RELATED ART

Steering wheels with a stationary pad are now under development with the intention, for example, of (1) improving operability of electronic elements, such as switches for powering a horn, a constant speed driving unit, communication equipment, a radio set, headlights, sounding units, indicators, and the like, accommodated in a pad section which is stationary and of (2) enhancing the value of merchandise by incorporating in it a feeling of high quality.

One type of stationary pad section mechanism is shown in FIG. 1. In this drawing, a steering shaft 58 passing through a column 57 has a boss 59 secured to its outer end portion, and a boss plate 61 is secured through welding to the periphery of the central portion of the boss 59 so as to extend horizontally outward therefrom.

A column-side sun gear 53b is attached to the periphery of the lower portion of the boss 59, a pad-side sun gear 53a is attached to the periphery of the upper portion of the boss 59, and a box-shaped pad section 51 is secured to the upper part of the sun gear 53a.

Two planetary shafts 54 and 64 are mounted via plain bearings 63 and 73 on the peripheral portion of the boss plate 61, and by these planetary shafts 54 and 64 are supported pad-side planetary gears 55a and 65a gearing with the padside sun gear 53a and column-side planetary gears 55b and 65b gearing with the column-side sun gear 53b, whereby the foregoing gear assembly composes the sun and planetary gear mechanism of the steering wheel.

These two planetary shafts 54 and 64 are disposed in spaced relation from each other and normally located at opposed positions about the steering shaft 58.

Even in the event of the steering wheel of the foregoing configuration, however, there exists backlash between the two sun gears 53a and 53b and the four planetary gears 55a, 55b, 65a, and 65b, as well as clearance owing to dimensional errors, assembly errors, etc.; accordingly, such backlash and clearance become some causes for occurrence of looseness and the generation of abnormal noise, so that a feeling of high quality which is one object of development is deteriorated.

Another type of steering wheel designed so as to suppress backlash and the like of the sun and planetary gear mechanism is disclosed in Japanese Utility Model Laid-Open No. 57-191654 which uses planetary rollers compatibly, however, this type has the problems that durability and assemblability of parts into this steering wheel are inferior.

To realize means for suppressing backlash and the like, one may think of a different type wherein planetary gears are provided movably in the radial direction of sun gears and urged toward the center of the radial direction of the sun gears by means, for example, of springs.

According to such a type as above, however, since the planetary gears can shift outward in the radial direction of the sun gears, they tend to come out of gear with the sun gears when, for instance, a turning force is applied from the exterior of the pad section. As a result, there arises another problem that the planetary gears slip in the circumferential direction of the sun gears to thereby rotate the pad section.

SUMMARY OF THE INVENTION

It is an object of the present invention to provide a steering wheel capable of overcoming the above-described problems that looseness or abnormal noise occurs in a pad section due to backlash or clearance between gears and a feeling of high quality is deteriorated.

It is another object of the present invention to provide a steering wheel capable of improving the efficiency of the task of assembly of the planetary shafts and making effective use of the space inside the sun and planetary gear mechanism.

It is still another object of the present invention to provide a steering wheel requiring no adjustment of phase of fixed-side planetary gears meshing with the sun gears.

It is a further object of the present invention to provide a steering wheel capable of using in common a metal mold in manufacturing column-side and pad-side planetary gears, thereby reducing the manufacturing cost.

It is a further object of the present invention to provide a steering wheel while obviating the drawbacks of cavity shrinkage and gear center offset arising in case the panetary gears are molded of resin and to prevent the occurrence of poor gearing that would result from manufacturing errors.

It is a further object of the present invention to provide a steering wheel in which occurrence of rocking motion of the pad section that would appear in the direction opposite to the steering/turning direction of the pad section is prevented.

It is a further object of the present invention to provide a steering wheel capable of suppressing backlash that would exist between planetary gears and sun gears and looseness between the gears that would be caused by finishing errors, assembly errors, etc.

It is a further object of the present invention to provide a steering wheel capable of lowering the control torque of steering control, suppressing the generation of abnormal noise, and suppressing backlash, and thus suppressing looseness of the pad section.

Other objects of the present invention will become apparent upon understanding of embodiments hereinafter described and will be indicated in the appended claims. Various advantages not referred to herein will occur to those skilled in the art upon practicing the present invention.

BRIEF DESCRIPTION OF THE DRAWINGS

FIG. 8 is a fragmentary sectional side view showing a steering wheel according to the third embodiment;

DETAILED DESCRIPTION OF THE PREFERRED EMBODIMENTS

Figure 1:
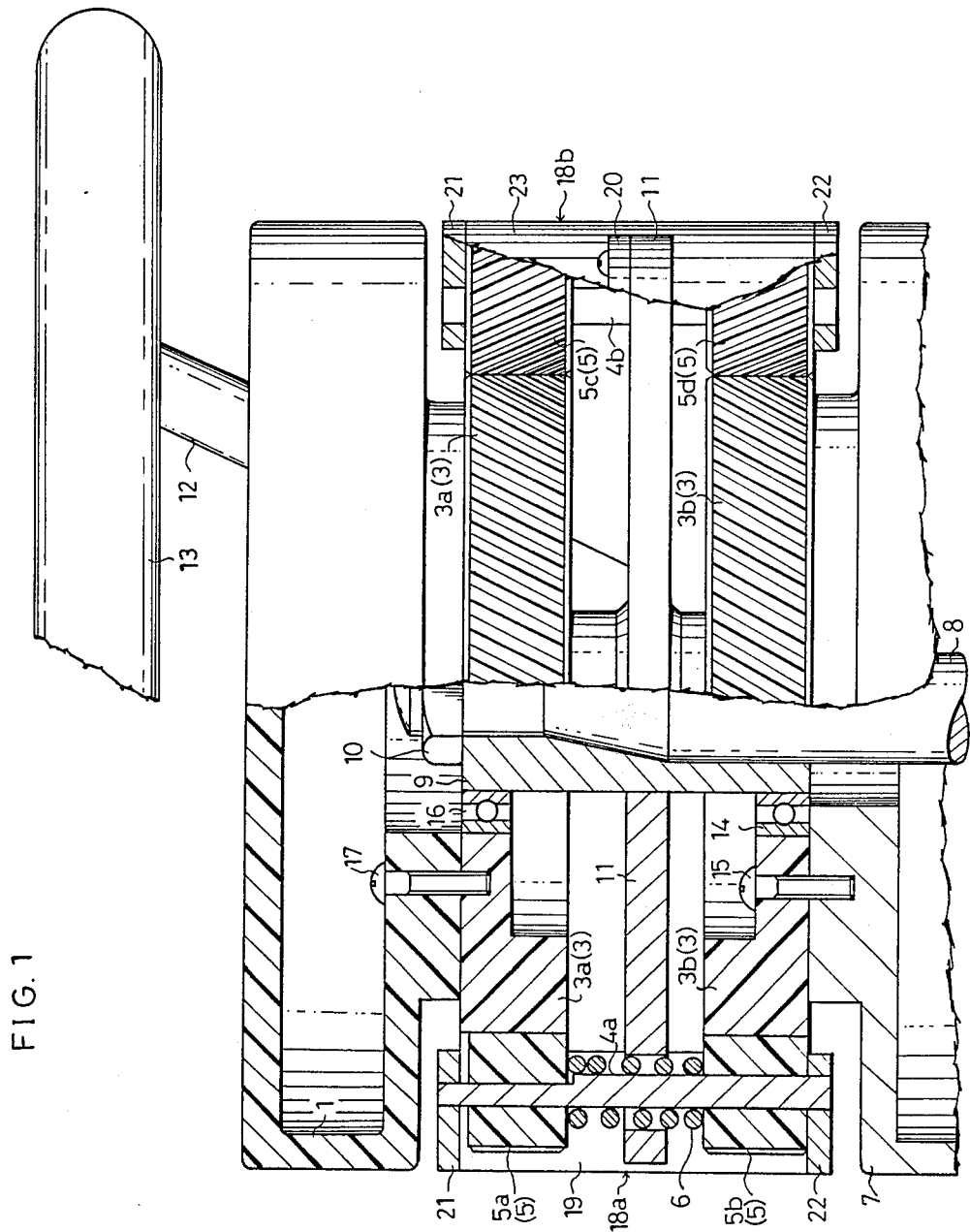
FIG. 1 is a fragmentary sectional view showing the steering wheel of the Related Art.

A first embodiment of the present invention in the form of a steering wheel of vehicles will now be described with reference to FIGS. 2 and 3.

The sun and planetary gear mechanism of this embodiment comprises two sun gears, i.e. a pad-side sun gear 3a and a column-side sun gear 3b, serving as sun gears 3; a padside planetary gear 5a and a column-side planetary gear 5b of a pair attached to one planetary shaft 4a; and a pad-side planetary gear 5c and a column-side planetary gear 5d of a pair attached to another planetary shaft 4b, the latter four serving as planetary gears 5 gearing with the corresponding sun gears 3a and 3b.

Figure 2:
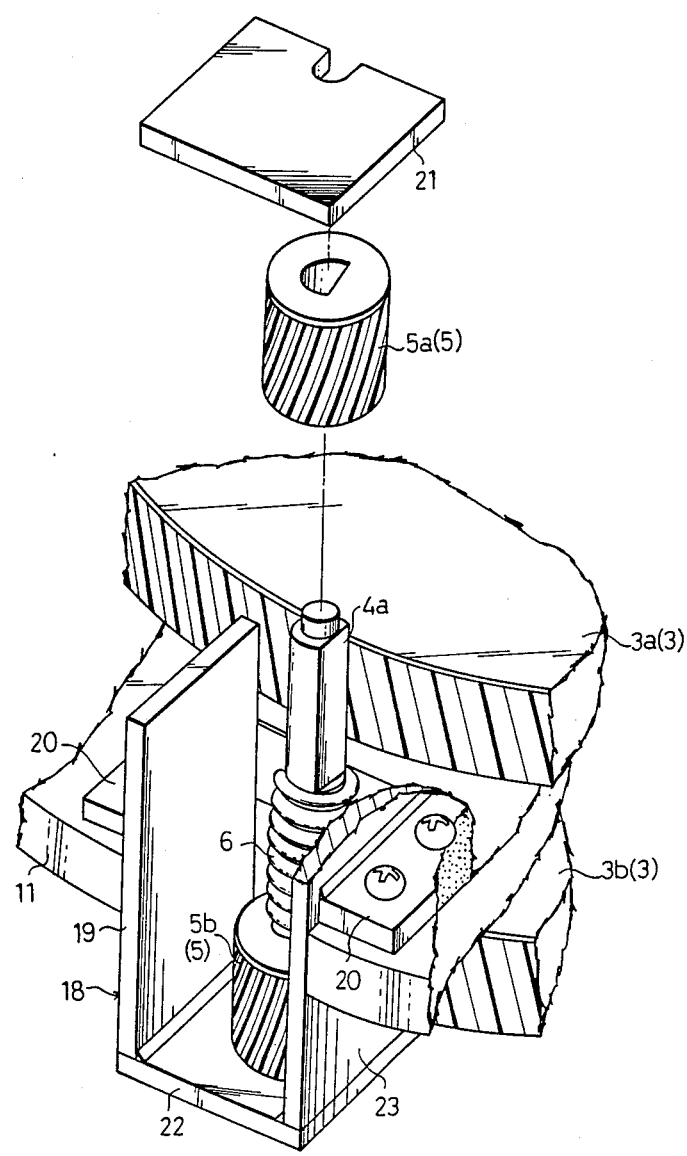
FIG. 2 is a fragmentary sectional view showing a first embodiment of the present invention.

As shown in FIG. 2, a steering shaft 8 passes through the vehicle steering column 7 and has a boss 9 tightened and secured to its outer end by a nut 10. A boss plate 11 is secured through welding to the central portion of the boss 9 so as to extend horizontally outward therefrom.

Spokes 12 are secured to the outer marginal portion of the boss plate 11, and a ring 13 is supported by the outer ends of the spokes 12.

The column-side sun gear 3b is of the helical gear type and is attached via a bearing 14 to the periphery of the lower portion of the boss 9 rotatably with respect to the boss 9, and secured non-rotatably to the column section 7 by means of clamping bolts 15.

On the other hand, the pad-side sun gear 3a of the helical gear type is attached via a bearing 16 to the periphery of the upper portion of the boss 9, and a boxshaped pad section 1 is secured to the upper part of the sun gear 3a by means of clamping bolts 17, this pad section being designed so that it can accommodate therein electronic elements (not shown), such as switches and meters.

Two planetary shaft supporting members 18a and 18b are secured to the peripheral portion of the boss plate 11 so as not to move in the radial direction of the two sun gears 3a and 3b. Each supporting member, 18a, 18b, has side frames 19 and 23 of a pair extending in the longitudinal direction of the axis of the steering shaft 8, and supporting members 20 welded to either side frame 19 or 23 are secured by screws on the boss plate 11, so that the supporting members 18a and 18b are secured on the boss plate 11 via both side frames 19 and 23.

Figure 3:
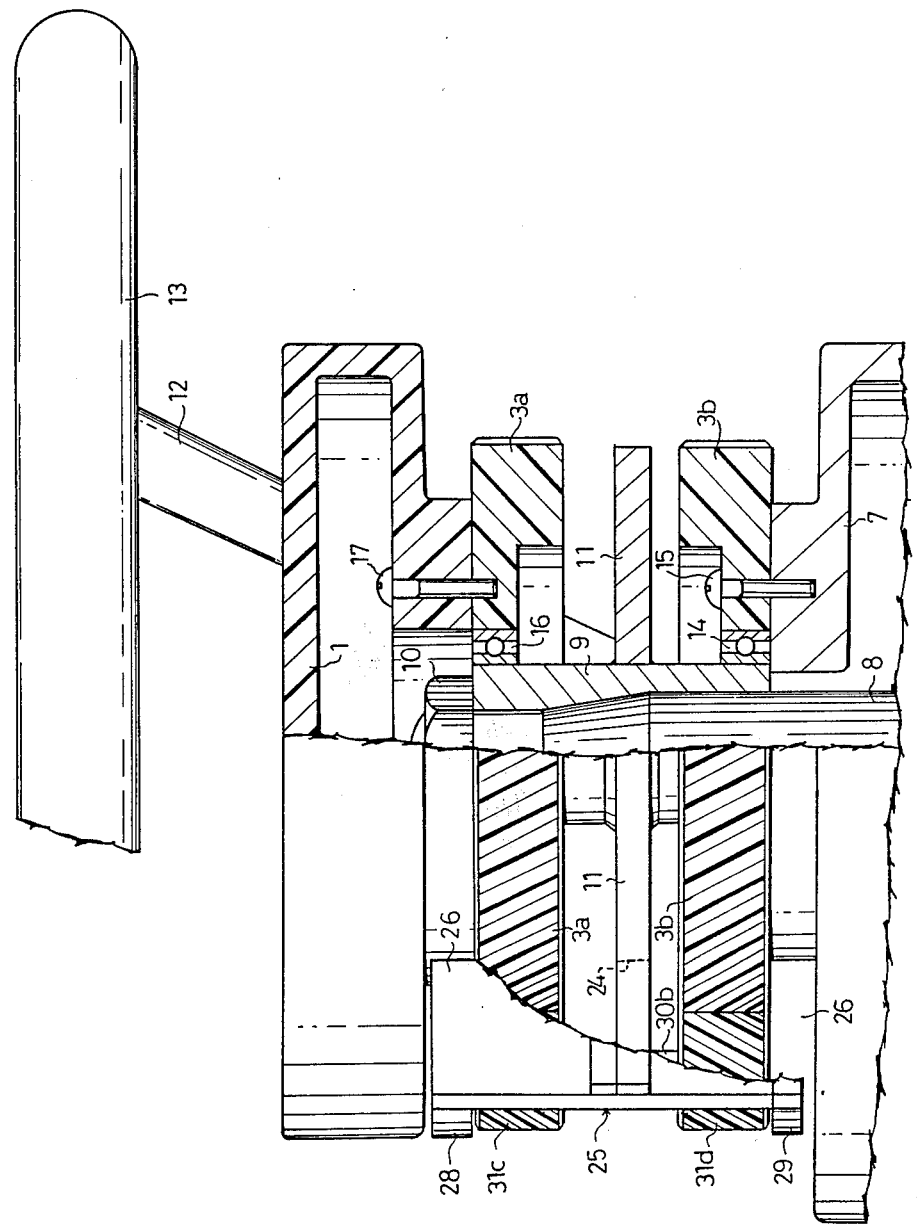
FIG. 3 is an exploded perspective view showing the mounting portion of planetary gears.

Referring to one planetary shaft supportin member 18a, as shown in FIG. 3, an upper plain bearing 21 and a lower plain bearing 22 are attached to the end portions spaced in the lengthwise direction of the side frames 19 and 23, the planetary shaft 4a is erected between these plain bearings, and on this shaft there are fitted the column-side planetary gear 5b, coil spring 6 serving as a resilient member, and pad-side planetary gear 5a in this order from the bottom. Certain gaps are left between the upper and lower plain bearings 21 and 22 and the respective outer end faces of the planetary gears 5a and 5b, and at least one of the planetary gears 5a and 5b is attached on the planetary shaft 4a movably in the longitudinal direction of the axis thereof. The coil spring 6 exerts its resilient force so as to separate the two planetary gears 5a and 5b from each other in the axial direction.

The magnitude of the resilient force is set to a strength enough to cause the surfaces on the side of the pad section 1 of respective teeth of the pad-side planet gear 5a to contact with the surfaces on the side of the boss plate 11 of respective teeth of the pad-side sun gear 3a and similarly, the surfaces on the side of the column section 7 of respective teeth of the column-side planetary gear 5b to contact with the surfaces on the side of the boss plate 11 of respective teeth of the columnside sun gear 3b.

Of course, gearing between the two sun gears 3a and 3b and the planetary gears 5a and 5b must be effected smoothly.

Referring to the other planetary shaft supporting member 18b, as shown in FIG. 2, the upper plain bearing 21 and the lower plain bearing 22 are attached to the upper end portions and the lower end portions of the side frames 19 and 23, one planetary shaft 4b is erected between these plain bearings, and the pad-side planetary gear 5c and columnside planetary gear 5d of a pair are attached to either end portion of the planetary shaft 4b non-movably in the longitudinal direction of the axis thereof.

However, a member corresponding to the coil spring 6, serving as a resilient member, mounted on the planetary shaft 4a is not fitted on this planetary shaft 4b. The reasons therefor are as below.

Since the pad-side sun gear 3a is supported rotatably relatively with respect to the boss 9 and this pad-side sun gear 3a and the pad-side planetary gear 5a are of the helical gear type, as an urging force is applied by the coil spring 6 attached to the planetary shaft 4a to the padside planetary gear 5a so that this gear 5a may separate from the column-side planetary gear 5b, a component force of the urging force acts so as to rotate the pad-side sun gear 3a.

If the pad-side sun gear 3a were rotated, gearing between the two planetary gears 5a and 5b attached to either end portion of the planetary shaft 4a and the two sun gears 3a and 3b would become loose, thereby bringing about backlash; as a result, the intended function of the coil spring 6 mounted on the planetary shaft 4a by which the padside planetary gear 5a and the column-side planetary gear 5b are separated from each other to thereby suppress backlash is not attained. Therefore, to prevent a small amount of rotation of the pad-side sun gear 3a caused by a component force of the coil spring 6 from occurring, the planetary shaft 4b, 5d must be fixed integrally to the supporting planetary shaft In assembling the steering wheel of the foregoing configuration, particularly the planetary shaft supporting member 18a, the coil spring 6 must be attached to the planetary shaft supporting member 18a while being kept in a slightly compressed state by means of the two planetary gears 5a and 5b.

The function and effect of the first embodiment of the foregoing configuration will now be described.

As the ring 13 is turned to perform steering control, in response to rotation of the boss plate 11, the two planetary gears 5a and 5c move around the pad-side sun gear 3a and the other two planetary gears 5b and 5d move around the column-side sun gear 3b while resolving on their respective axes.

However, since the column-side sun gear 3b is secured to the column section 7, it does not rotate, and the padside sun gear 3a also does not rotate apparently because of the gear 3b and is always held in the non-rotative state with respect to the column section 7. Accordingly, the pad section 1 secured to the pad-side sun gear 3a also is in the non-rotative state.

On the other hand, since the coil spring 6 provided on the planetary shaft 4a functions so as to separate the padside planetary gear 5a and the column-side planetary gear 5b from each other in the axial direction of the shaft 4a, the pad-side planetary gear 5a urges upward the pad-side sun gear 3a so that the surfaces on the side of the pad section 1 of respective helical teeth of the pad-side planetary gear 5a are in contact with the surfaces on the side of the boss plate 11 of respective helical teeth of the pad-side sun gear 3a.

Since the pad-side planetary gear 5a urges the pad-side sun gear 3a so as to be pushed up and the pad-side sun gear 3a is of the helical gear type, a part of the urging force applied to the surfaces on the side of the boss plate 11 of the helical teeth becomes the component force for turning the pad-side sun gear 3a.

Thus, due to this component force the pad-side sun gear 3a tends to rotate a little but, because the pad-side planetay gear 5c and the column-side planetary gear 5d secured to either end portion of the planetary shaft 4b not provided with the coil spring 6 are in gear with the padside sun gear 3a and the column-side sun gear 3b, respectively, and the column-side sun gear 3b is secured to the column section 7 non-rotatably, a little rotation of the pad-side sun gear 3a is prevented from occurring, thereby backlash being suppressed.

Therefore, the planetary shaft 4b not provided with the coil spring 6 and the two planetary gears 5c and 5d secured to the former function as a rotation stopper against the pad-side sun gear 3a.

In this way, with backlash of the pad-side sun gear 3a being suppressed, the surfaces on the side of the pad section 1 of respective helical teeth of the pad-side planetary gear 5a are always in contact with the surfaces on the side of the boss plate 11 of respective helical teeth of the pad-side sun gear 3a.

On the other side, the relation between the column-side planetary gear 5b and the column-side sun gear 3b is similar to that between the pad-side planetary gear 5a and the pad-side sun gear 3a, that is, the column-side planetary gear 5b moves around the column-side sun gear 3b with the surfaces on the side of the column section 7 of respective helical teeth of the column-side planetary gear 5b being kept always in contact with the surfaces on the side of the boss plate 11 of respective helical teeth of the column-side sun gear 3b.

Therefore, in connection with the pad-side sun gear 3a and the column-side sun gear 3b revolving in phase, it seems as if one tooth of the planetary gear were put between two teeth of the sun gears while being maintained in the contacted state therewith; thus, clearance owing to backlash, assembly errors of gears, and the like can be suppressed.

Accordingly, no looseness appears between the pad-side sun gear 3a and the two pad-side planetary gears 5a and 5c and between the column-side sun gear 3b and the two column-side planetary gears 5b and 5d, and generation of abnormal noise is suppressed at the time of steering control.

Further, since the planetary shafts 4a and 4b to which the planetary gears 5a, 5b, 5c, and 5d are attached are prevented from moving in the radial direction of the two sun gears 3a and 3b by means of the boss plate 11, gearing between the planetary gears 5a, 5b, 5c and 5d and the two sun gears 3a and 3b can not be broken, which is different from the technique described hereinabove.

As will be apparent from the foregoing, the feature of this first embodiment is characterized in that backlash between the two sun gears 3a and 3b and the four planetary gears 5a, 5b, 5c, and 5d of the helical gear type is suppressed by attaching a resilient member to one planetary shaft 4a, causing the two planetary gears 5a and 5b attached to that shaft to approach mutually or separate from each other by means of the action of that resilient member, and securing the two planetary gears 5c and 5d to the other planetary shaft 4b to thereby prevent rotation of the pad-side sun gear 3a.

The present invention should not be limited to the first embodiment described above and of course, can be modified in various ways within an extent not degrading significantly the effects of the present invention.

For example, planetary shaft supporting members 18a and 18b for attachment of the planetary gears 5a, 5b, 5c, and 5d can be changed arbitrarily in design.

Further, the coil spring 6 may be replaced with one for causing the planetary gears 5a and 5b of a pair to approach mutually in the longitudinal direction of the axis of the planetary shaft 4a.

Furthermore, the upper plain bearing 21a and the lower plain bearing 21b may be supported directly by the boss plate 11, without interposing the side frames 19 and 23 therebetween. In addition, it is also possible to attach one bearing to the central portion of the planet shaft 4a, secure this bearing to the boss plate 11, and interpose the coil spring 6 between the bearing and the planetary gears 5a and 5b.

Sliding portions of the pad-side planetary gear 5a and the planetary shaft 4a may be made in the form of a spline fit configuration, for example.

Moreover, it is also possible to make two planetary gears 5 (being attached to one planetary shaft 4) gear simultaneously with one sun gear 3, thus, attach four planetary gears 5 in total to one planetary shaft 4a, and urge two planetary gears 5 so as to approach mutually or separate from each other.

In brief, according to the first embodiment, with the essential function of the epicyclic gear mechanism being preserved, backlash and clearance owing to assembly errors and the like caused at the time of assembly of the mechanism can be suppressed, and looseness can be obviated. As a result, abnormal noise is not generated at the time of using the steering wheel for steering control.

Figure 4:
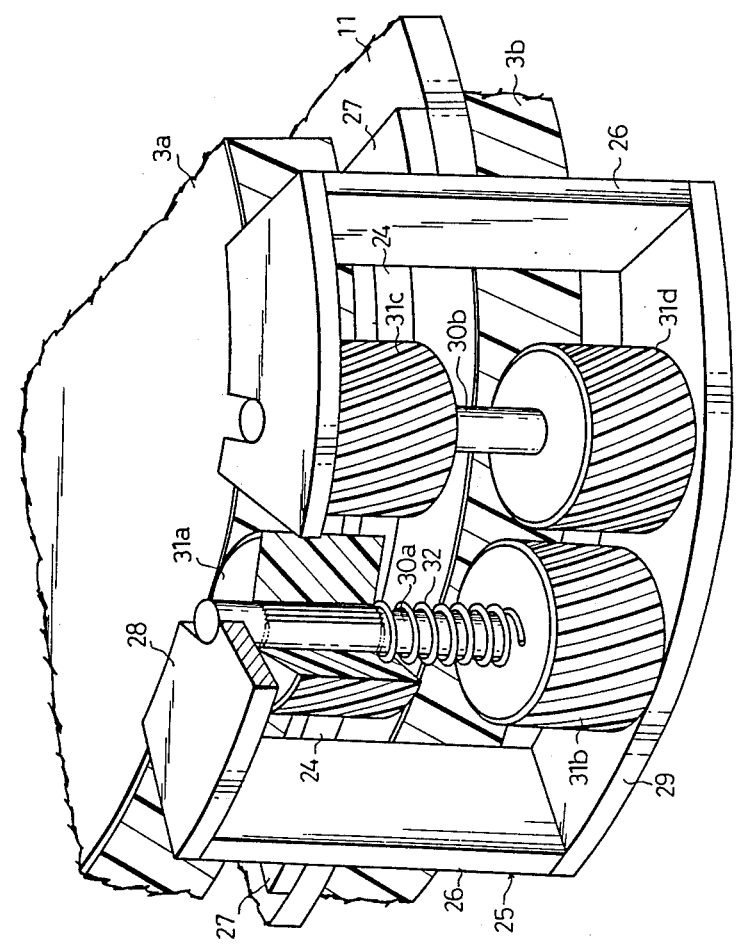
FIG. 4 is a fragmentary sectional view showing a second embodiment of the present inveniton.

A second embodiment of the present invention will now be described with reference to FIGS. 4 and 5.

One bearing unit 25 is fitted in a notch 24 formed in the peripheral portion of the boss plate 11 and secured to the boss plate 11.

Figure 5:
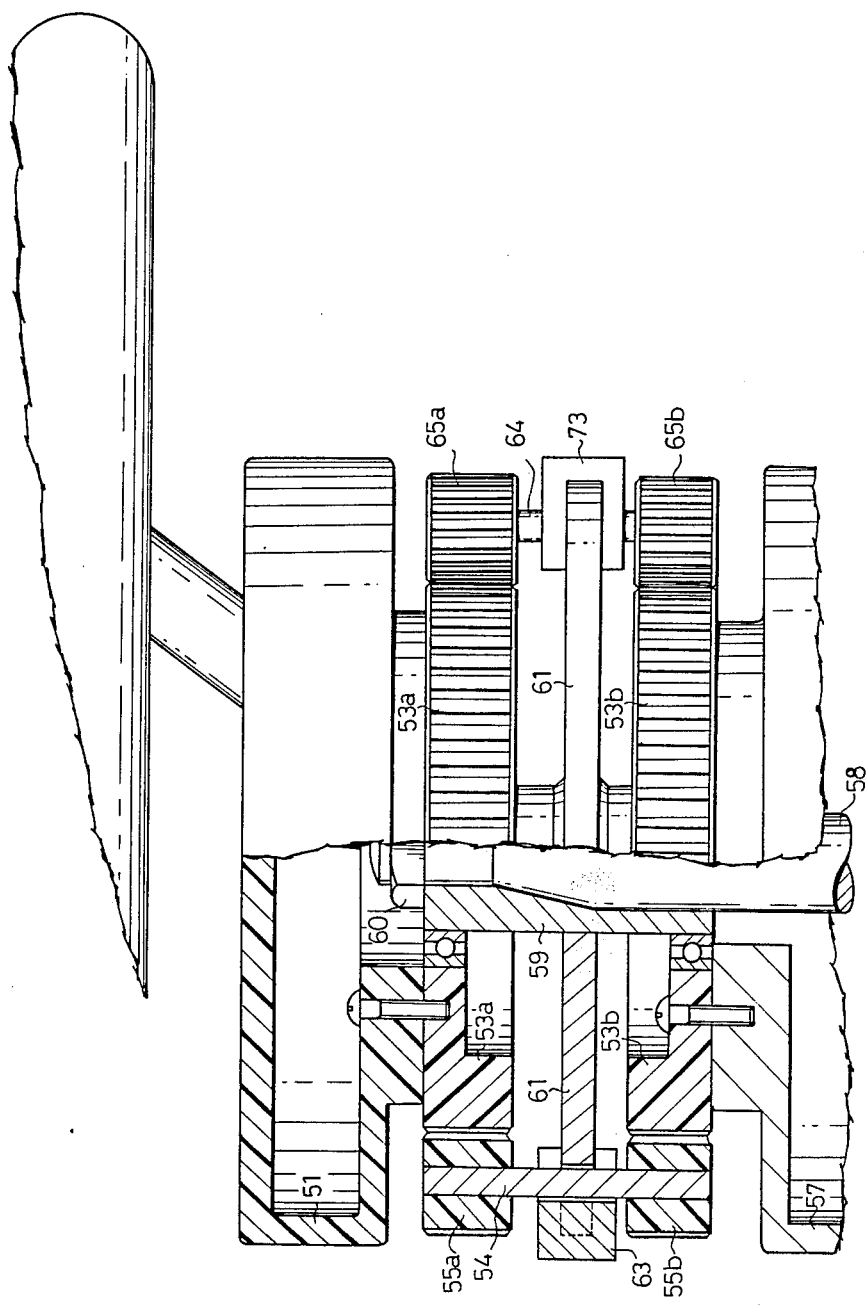
FIG. 5 is a perspective view showing a bearing unit.

As shown in FIG. 5, the bearing unit 25 comprises two vertically and parallelly erected side plates 26 extending in the longitudinal direction of the axis of the steering shaft 8, supporting members 27 secured through welding to the respective central portions of the outside faces of the side plates 26, and an upper plain bearing 28 and a lower plain bearing 29 secured to the end faces of the side plates 26 spaced in the lengthwise direction thereof. The bearing unit 25 can be secured to the boss plate by securing the side plates 26 to the boss plate via the supporting members 27.

Two planetary shafts 30a and 30b are coupled in mutually parallel relation to the upper plain bearing 28 and the lower plain bearing 29 in an erected posture.

On one of the two planetary shafts 30a and 30b, namely the shaft 30a, there are fitted a column-side planetary gear 31b, resilient member 32, and pad-side planetary gear 31a in this order from the bottom, these planetary gears 31a and 31b of a pair, constituting the helical gear type, are assembled rotatably together with the planetary shaft 30a, and at least one of the planetary gears is attached to the planetary shaft 30a movably in the longitudinal direction of the axis thereof. Certain gaps are left between the upper and lower plain bearings 28 and 29 and the corresponding outer end faces of the planetary gears 31a and 31b.

The planetary gears 31a and 31b of a pair are spline-fitted on the planetary shaft 30a and urged by a coil spring serving as a resilient member 32 so as to separate from each other in the axial direction of the planetary shaft 30a.

The other planetary shaft 30b is disposed close to the planetary shaft 30a, but spaced therefrom a distance a little longer than the diameter of the planetary gears 31a and 31b. A pad-side planetary gear 31c and a column-side planetary gear 31d are attached to the planetary shaft 30b, and this planetary shaft 30b and these planetary gears 31c and 31d of a pair are fixed integrally together.

The foregoing configuration, similarly to the first embodiment, is provided for preventing occurrence of a little rotation of the pad-side sun gear 3a that would otherwise be caused by a component force of the urging force of the resilient member 32 acting on the pad-side planetary gear 31a.

In assembling the epicyclic gear mechanism of the foregoing configuration, after beforehand assembly of the bearing unit 25 this unit is fitted in the notch 24 of the boss plate 11. Then, the supporting members 27 are hung on the boss plate 11 and secured by screws.

In assembling the bearing unit 25, the pad-side planetary gear 31a and the column-side planetary gear 31b are spline-fitted on the planetary shaft 30a on which the resilient member 32 is mounted, the planetary shaft 30a is attached between the upper plain bearing 28 and the lower plain bearing 29 while compressing the resilient member 32 between these gears 31a and 31b, the pad-side planetary gear 31c and the column-side planetary gear 31d are secured to either end of the other planetary shaft 30b, and this planetary shaft 30b is coupled to the upper plain bearing 28 and the lower plain bearing 29.

The function and effect of the steering wheel of the foregoing configuration will now be described.

As the ring 13 is turned to perform steering control, the boss plate 11 and the bearing unit 25 are rotated, and in response to rotation of the bearing unit 25, the two planetary shafts 30a and 30b and the four planetary gears 31a, 31b, 31c, and 31d move around the two sun gears 3a and 3b while revolving on their respective axes.

However, since the column-side sun gear 3b is secured to the column section 7, it does not rotate, and the padside sun gear 3a also does not rotate because of the gear 3b. Accordingly, the pad-side sun gear 3a is always held in the non-rotative state with respect to the column section 7. Thus, the pad section 1 secured to the sun gear 3a also is in the non-rotative state.

On the other hand, owing to the action of the resilient member 32 of the planetary shaft 30a, the surfaces on the side of the boss plate 11 of respective helical teeth of the pad-side sun gear 3a are always in contact with the surfaces on the side of the pad section 1 of respective helical teeth of the pad-side planetary gear 31a, and similarly, the surfaces on the side of the boss plate 11 of respective helical teeth of the column-side sun gear 3b are always in contact with the surfaces on the side of the column section 7 of respective helical teeth of the column-side planetary gear 31b.

Therefore, the planetary gears 31a and 31b attached to the planetary shaft 30a suppress backlash, occurrence of looseness, and generation of abnormal noise that would otherwise appear in clearances resulting from assembly errors of the gears and the like.

Further, the two planetary shafts 30a and 30b can easily and accurately be attached to the boss plate 11 in one step, by attaching the planetary shaft 30a having the planetary gears 31a and 31b already splinefitted thereto to the bearing unit 25, attaching the other planetary shaft 30b having the planetary gears 31c and 31d secured to either end portion thereof to the bearing unit 25, and securing the thus assembled bearing unit 25 to the boss plate 11.

The foregoing work of assembly of the steering wheel according to this second embodiment can be achieved easily through a few steps, compared with the case in which after the planetary gears 55a, 55b, 65a, and 65a are secured to either end portion each of the two planetary shafts 54 and 64, these planetary shafts 54 and 64 are attached to the boss plate 11 through two steps.

In addition, since the two elongate planetary shafts 30a and 30b are gathered in one bearing unit 25 in closely adjoined relation, the space inside the sun and planetary gear mechanism according to this embodiment can be utilized effectively as a space for relays and the like, compared with such a type of sun and planetary gear mechanism as provided in the related art wherein the two planetary shafts 54 and 64 are attached to the boss plate 61 in mutually spaced relation.

This second embodiment of the present invention can be put into practice as follows without degrading significantly the effects of the present invention:

(1) The gears of the sun and planetary gear mechanism may be of the spur gear type. In this case, one end portion of the resilient member 32 fitted on the planetary shaft 30a may be secured to the pad-side planetary gear 31a and the other end portion to the column-side planetary gear 31b in such a manner that a resilient force is exerted by the resilient member 32. According to this modification, because a turning urging force is applied to the two planetary gears 31a and 31b so that they tend to move in mutually opposite directions along their respective circumferences, the teeth of, for example, the pad-side sun gear 3a are pinched by the teeth of the two planetary gears, for example, 31a and 31b, backlash being thereby suppressed.

(2) The coil spring 32 may be of the type which causes the planetary gears 31a and 31b of a pair to approach mutually in the longitudinal direction of the axis of the planetary shaft 30a.

(3) Although the resilient member 32 is mounted on the planetary shaft 30a, another resilient member may be fitted on the other planetary shaft 30b. In the latter case, it is better to provide a stepped portion on the inside each of the upper plain bearing 28 and the lower plain bearing 29 of the bearing unit 25 so that the two planetary gears 31c and 31d can no more separate from each other at certain spots of the planetary shaft 30b within the extent in which backlash can be suppressed by the action of the resilient member 32.

In brief, according to the second embodiment, there are provided, in addition to the effects of the first embodiment, the effects that the efficiency of assembly work for the two planetary shafts can be enhanced and the space inside the sun and planetary mechanism can be utilized effectively.

A third embodiment of the present invention will now be described with reference to FIGS. 6 through 8.

Figure 6:
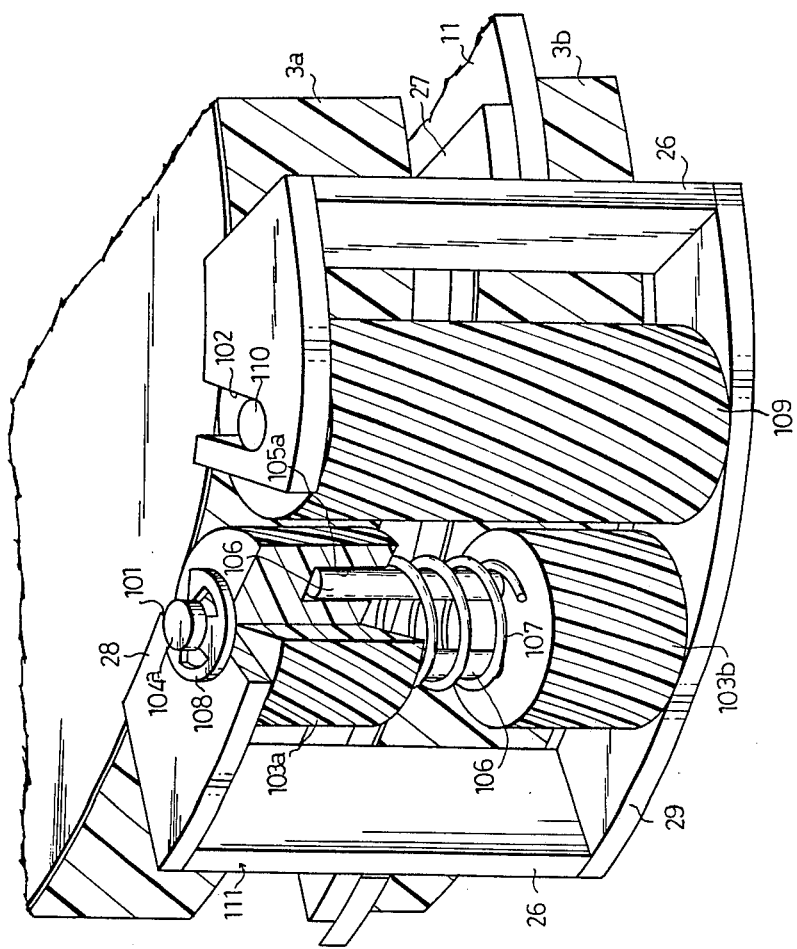
FIG. 6 is a fragmentary perspective view showing the important portion of a third embodiment of the present invention.

As shown in FIG. 6, two vertically confronting pairs of plain bearing portions 101 and 102 in the form of a notch are provided in the upper plain bearing 28 and the lower plain bearing 29.

In FIG. 6, the left-hand pair of plain bearing portions 101 supports rotatably planetary shafts 104a and 104b of pad-side and column-side planetary gears 103a and 103b of the helical gear type gearing with the corresponding sun gears 3a and 3b of the helical gear type, and certain gaps are left between the upper and lower plain bearings 28 and 29 and the corresponding outer end faces of the planetary gears 103a and 103b.

Figure 7:
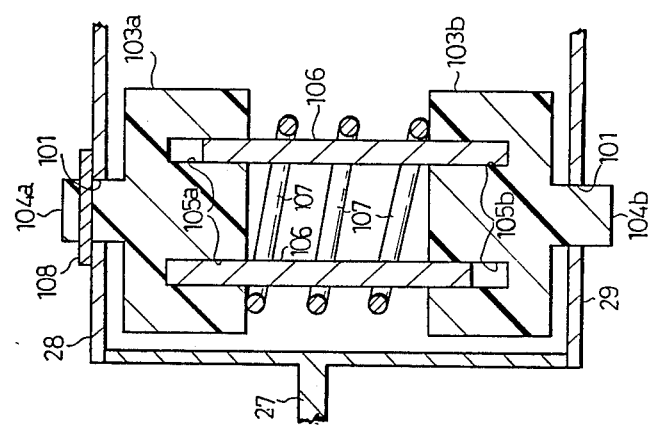
FIG. 7 is a sectional view showing planetary gears on the pad side and on the column side in the third embodiment.

As shown in FIG. 7, each of the mutually confronting inner faces of the pad-side planetary gear 103a and the columnside planetary gear 103b has two cavities, 105a, 105b, formed at positions offset from the rotary center, in those cavities 105a and 105b are inserted slidably two parallel pins 106. Specifically, one end each of the parallel pins 106 is secured to either planetary gear 103a or 103b, with the other end left slidable.

The two planetary gears 103a and 103b are urged so as to separate from each other by means of a spring 107 inter-posed between the planetary gears 103a and 103b, and caused to rotate simultaneously in the same mode by means of the parallel pins 106.

For the upper plain bearing 28, a metallic E-ring 108 is fitted on the planetary shaft 104a of the pad-side planetary gear 103a to restrict the relative movable distances in the axial direction of the pad-side and column-side planetary gears 103a and 103b to thereby prevent the rocking motion of the pad section 1 in the turning direction of steering.

In FIG. 6, the right-hand pair of bearing portions 102 supports rotatably a planetary shaft 110 of one fixed-side planetary gear 109 gearing simultaneously with both the pad-side and column-side sun gears 3a and 3b. This configuration is incorporated for the same reason as that of the first or second embodiment, i.e. in order to prevent rotation of the pad-side sun gear 3a that would otherwise occur due to the force of the spring 107 for urging the pad-side planetary gear 103a.

In assembling the bearing unit 111 of the foregoing configuration, it can be completed by joining together the padside planetary gear 103a and the column-side planet gear 103b by the spring 107 and the two parallel pins 106, fitting the thus joined unit between the bearing portions 101 of the two plain bearings 28 and 29 while compressing the planetary gears 103a and 103b, and fitting the other planetary gear 109 between the other bearing portions 102.

According to this third embodiment, there are provided, in addition to the functions and effects of the first and second embodiments, the following functions and effects:

Since the fixed-side planetary gear 109 gearing simultaneously with both the sun gears 3a and 3b is made in the form of a single planetary gear, the number of parts is reduced, and a complicated phase-adjusting step is not needed that is required if two gears are provided one for each sun gear 3a or 3b.

Further, since the pad-side and column-side planetary gears 103a and 103b are made into the same shape, one metal mold can be used in common in manufacturing these gears; thus, the manufacturing cost can be reduced.

Furthermore, since the pad-side and column-side planetary gears 103a and 103b are not so three-dimensional in appearance, there is less likelihood of producing a shrinkage cavity and of offset of the gear center even if the planetary gears 103a and 103b are made of resin; thus, gearing is not degraded due to said manufacturing errors.

Moreover, since the E-ring 108 is interposed and fitted between the planetary shaft 104a of the pad-side planetary gear 103a and the upper plain bearing 28 to restrict the vertical movable distances of the pad-side and column-side gears 103a and 103b, the rocking motion of the pad section 1 in the turning direction of steering of the pad section 1 can be prevented.

This third embodiment of the present invention may be put into practice as follows:

(1) The E-ring 108 may be fitted on the planetary shaft 104b of the column-side planetary gear 103b, except that certain gaps must be left between the outer end faces of the planetary gears 103a and 103b and the upper and lower plain bearings 28 and 29. In the case of no gap being left, the planetary gears 103a and 103b cannot move vertically.

(2) The parallel pins 106 may be assembled so that their both end portions can slide in the cavities 105a and 105b formed in the respective planetary gears 103a and 103b.

A fourth embodiment of the present invention will now be described with reference to FIGS. 9 through 14.

Figure 11:
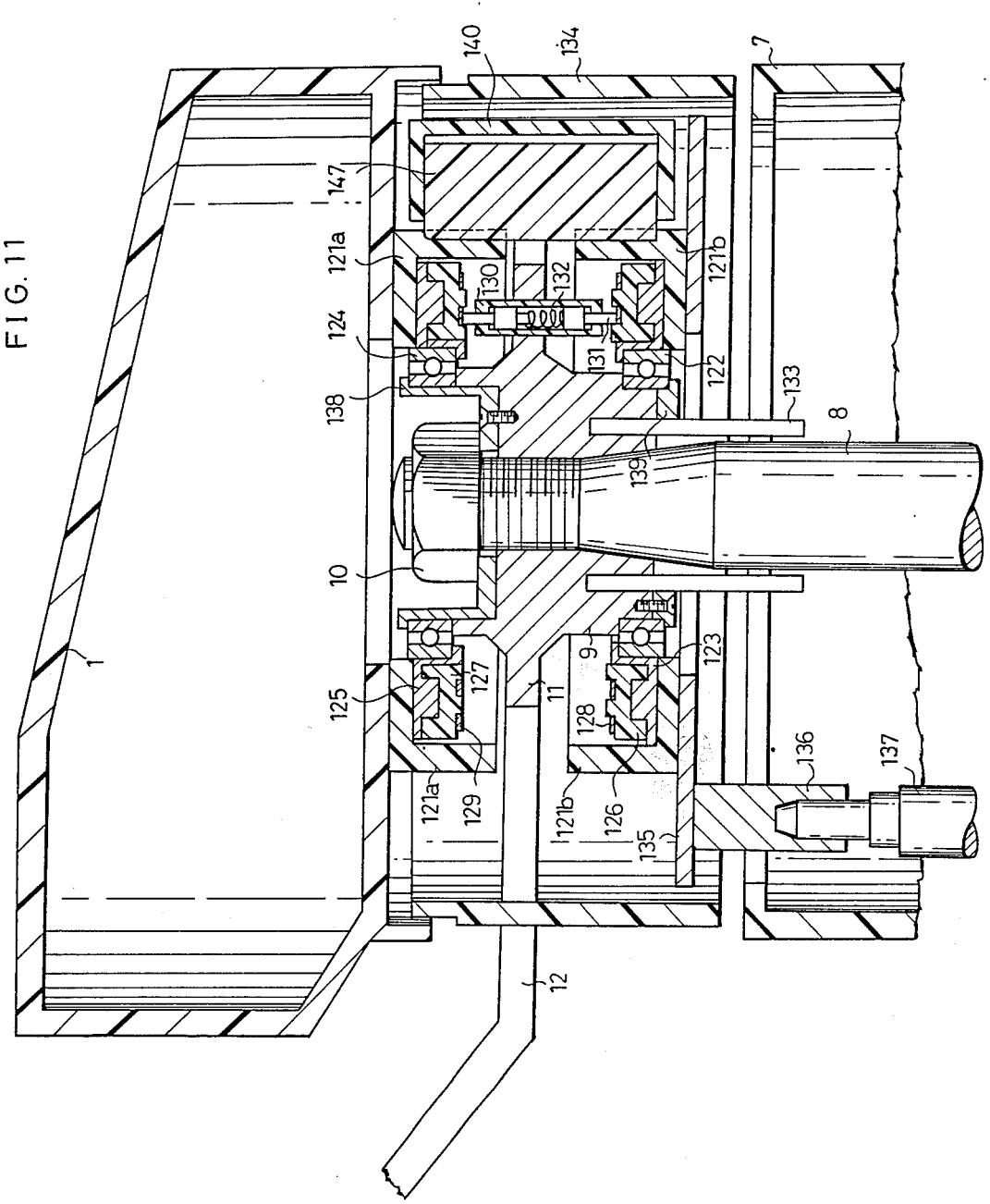
FIG. 11 is a sectional view showing the fourth embodiment of the present invention.

As shown in FIG. 11, a column-side sun gear 121b of the helical gear type whose thread helix angle is 45° is disposed around the periphery of the lower portion of the boss 9 and secured to the column section 7, but movable relatively with respect to the boss 9 via a bearing 122 and a metallic outer race 123.

On the other side, a pad-side sun gear 121a of the helical gear type whose helix angle of thread is 45° is disposed around the periphery of the upper portion of the boss 9 via a bearing 124 and a metallic outer race 125, and the bearings 122 and 124 are press-fitted in the metallic outer races 123 and 125, respectively.

Insulating plates 126 and 127 made of synthetic resin are deposited on the outer races 123 and 125 inside the two sun gears 121b and 121a, and slip rings 128 amd 129 are secured to the face of the insulating plate 126 and the face of the insulating plate 127, respectively. These slip rings 128 and 129 are for relaying signals and the like between electronic elements ( not shown ) inside the pad section 1 and other electronic elements ( not shown ) disposed elsewhere on the car body, via contact pins 131 and springs 132 stored in a contact pin case 130 secured to the boss plate 11. Reference numeral 133 indicates cancel pins for releasing a winker mechanism, and 134 is a cover for preventing intrusion of foreign substance into the sun and planetary gear mechanism and for improving the external appearance.

Receiving members 136 are secured to a receiver base 135 screwed to the column-side sun gear 121b, and fixed pins 137 are press-contacted with the receiving members 136.

Specifically, there are provided two sets of receiving members 136 and fixed pins 137 at two spots, and the receiving members 136 are made to press-contact with corresponding fixed pins 137 so as to deflect a little at opposite positions, therefore, the column-side sun gear 121b is fixed so as not to revolve. Further; the fixed pins 137 fix also a combination switch having a winker mechanism not shown. For reference, the bearings 124 and 122 are secured to the boss 9 through screwing an upper stopper 138 and a lower stopper 139 to the boss 9.

Figure 9:
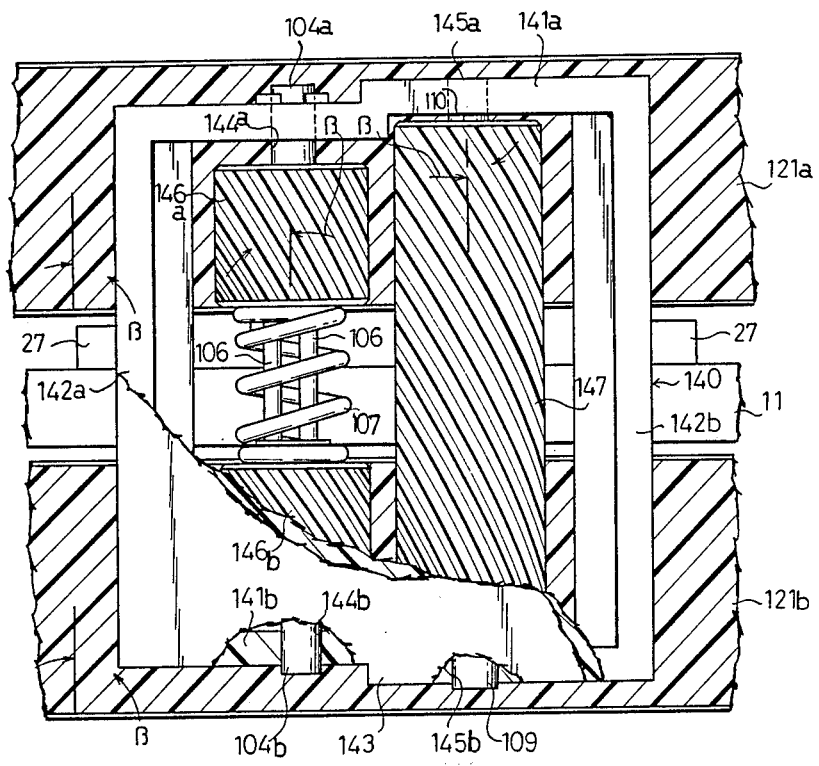
FIG. 9 is a fragmentary sectional side view showing the mounting portion of plaetary gears in a fourth embodiment of the present invention.
Figure 10:
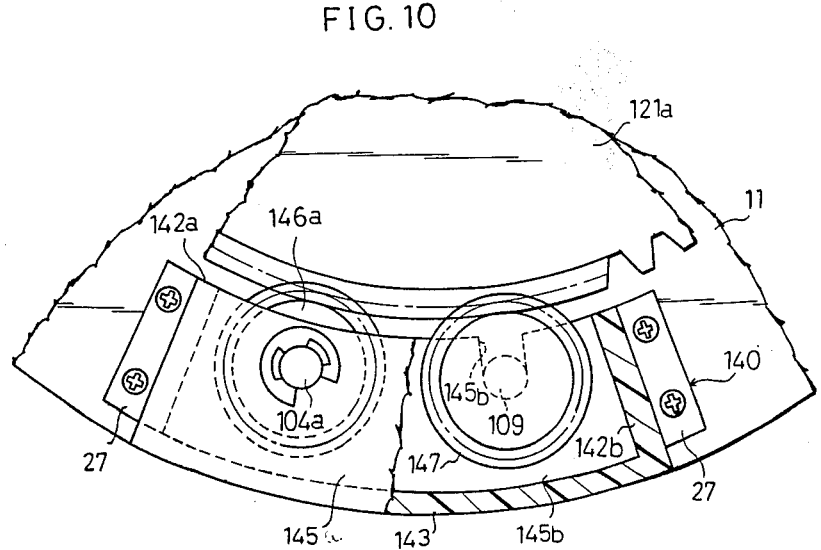
FIG. 10 is a fragmentary plan view corresponding to FIG. 9.

As shown in FIGS. 9 and 10, a bearing unit 140 comprises upper plain bearing 141a and lower plain bearing 141b of sector shape spaced vertically from each other, side plates 142a and 142b for coupling vertically together the inner faces at either edge each of these plain bearings 141a and 141b, and a back plate 143 having a curved surface attached to these plain bearings 141a and 141b and side plates 142a and 142b on the side opposite to the other side confronting the sun gears 121a and 121b, these parts being made of synthetic resin as a single unit.

Each of the upper plain bearing 141a and the lower plain bearing 141b is bent in the right-hand half in FIG. 9 so as to assume a different level or have a stepped shape; that is, the right-hand half of the upper plain bearing 141a takes a high level, whereas the right-hand half of the lower plain bearing 141b takes a low level.

The upper plain bearing 141a has two bearing portions 144a and 145a, and the lower plain bearing 141b has two bearing portions 144b and 145b. Accordingly, the vertical spacing between the bearing portions 145a and 145b on the right-hand side is larger than the vertical spacing between the bearing portions 144a and 144b on the lefthand side.

A column-side planetary gear 146b of the helical gear type whose thread helix angle $\beta$ is 45° is supported rotatably via a planetary shaft 104b by one bearing portion 144b of the lower bearing 141b so as to be in gear with the column-side sun gear 121b whose thread helix angle $\beta$ is identical to that of the former, i.e. 45°.

Further, a pad-side planetary gear 146a of the helical gear type whose thread helix angle $\beta$ is identical to that of the column-side planetary gear 146b, i.e. 45°, is provided on the upper end portions of the parallel pins 106 erected on the planetary gear 146b movably vertically with respect to the parallel pins 106, and held in gear with the pad-side sun gear 121a.

On the other hand, a planetary gear 147 in the form of a single helical gear whose thread helix angle $\beta$ is 45° is supported rotatably by the bearing portions 145a and 145b on the other-hand side in gear simultaneously with the two sun gears 121a and 121b.

The planetary gear 147 is supported rotatably by the bearing portions 145a and 145b whose spacing is larger than the vertical spacing between the bearing portions 144a and 144b, and the tooth width of the planetary gear 147 is made relatively long so as not to leave a large gap between it and the upper bearing 141a or the lower bearing 141b.

According to the fourth embodiment, there are provided, in addition to the functions and effects of the first through third embodiments, the following functions and effects:

Since the thread helix angle $\beta$ of the pad-side sun gear 121a, column-side sun gear 121b, pad-side planetary gear 146a, column-side planet gear 146b, and planetary gear 147 is set to be as large as 45°, a component force in the direction of tooth trace out of those of the urging force of the planetary gears 146a and 146b against the sun gears 121a and 121b, caused by the coil spring 107, becomes small; thus, rubbing between the tooth surface of the sun gear and the planetary gear is lessened, the control torque is lowered, and generation of abnormal noise is suppressed.

For test purposes, specimens of the pad-side sun gear 121a, column-side sun gear 121b, pad-side planetary gear 146a, column-side planetary gear 146b, and planetary gear 147 were produced, changing widely their thread helix angle $\beta$, and they were assembled into steering wheels of the same configuration as that of this embodiment. Then, these steering wheels thus manufactured were tested three to five times repeatedly to get the relation between the thread helix angle $\beta$ and the torque necessary for control of the ring.

Figure 12:
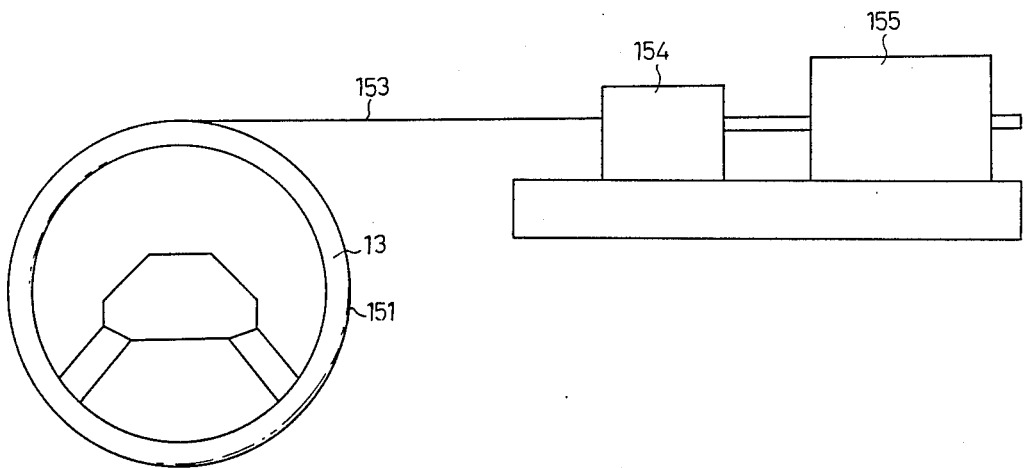
FIG. 12 is an explanatory diagram showing a system of measuring the control torque in the fourth embodiment.
Figure 13:
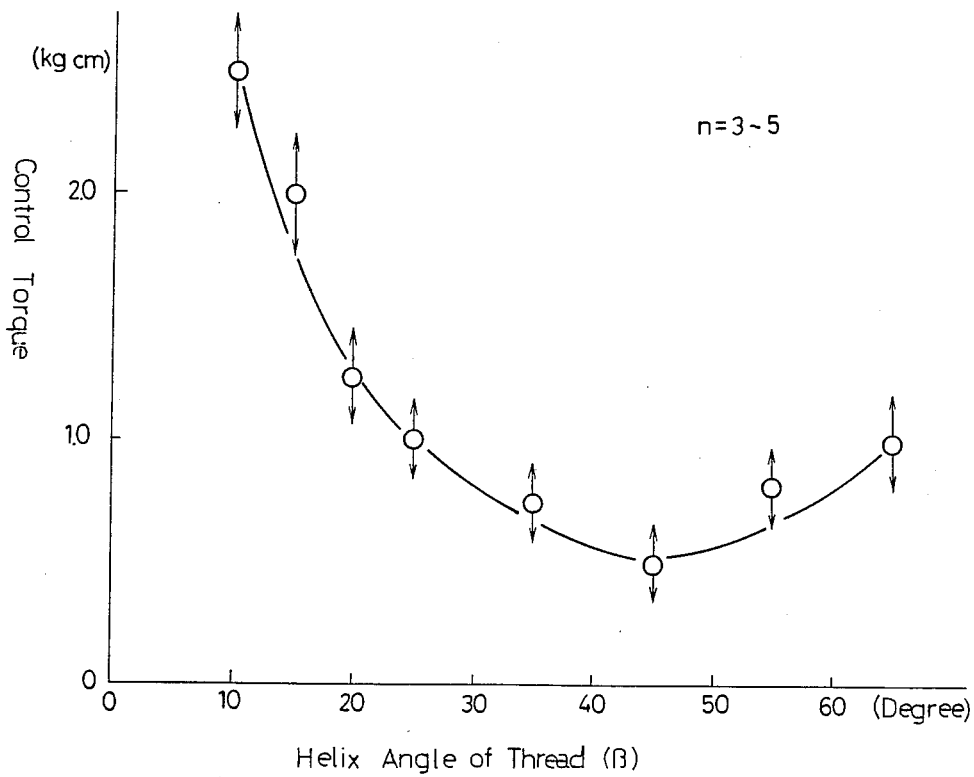
FIG. 13 is a graph showing the relation between helix angle of thread and control torque in the fourth embodiment.

For reference, the torque necessary for control of the ring, i.e. the control torque, was obtained, as shown in FIG. 12, by winding one end portion of a wire 153 round the ring 13 of a steering wheel 151, coupling the other end portion to a load meter 154, moving the load meter 154 by the use of a linear motor 155, and reading the load when the ring 13 started to turn. The obtained relation between the load thus measured and the thread helix angle $\beta$ of the respective gears 121a, 121b, 146a, and 147 included in the sun and planetary gear mechanism is shown in FIG. 13.

Through inspection of the curve, it is clear that as the helix thread angle $\beta$ increases the control torque decreases gradually. It becomes smaller than 1.0 Kg.cm in average in the range of 25° to 65°, and, as the thread helix angle $\beta$ increases further the control torque increases again. Accordingly, if the thread helix angle $\beta$ of the helical gears is selected so as to fall within the range of 25° to 65°, preferably within the range of 35° to 55°, the maximum value of the control torque becomes smaller than 1.0 Kg.cm; thus, there can be obtained a steering wheel of small steering control resistance.

Figure 14:
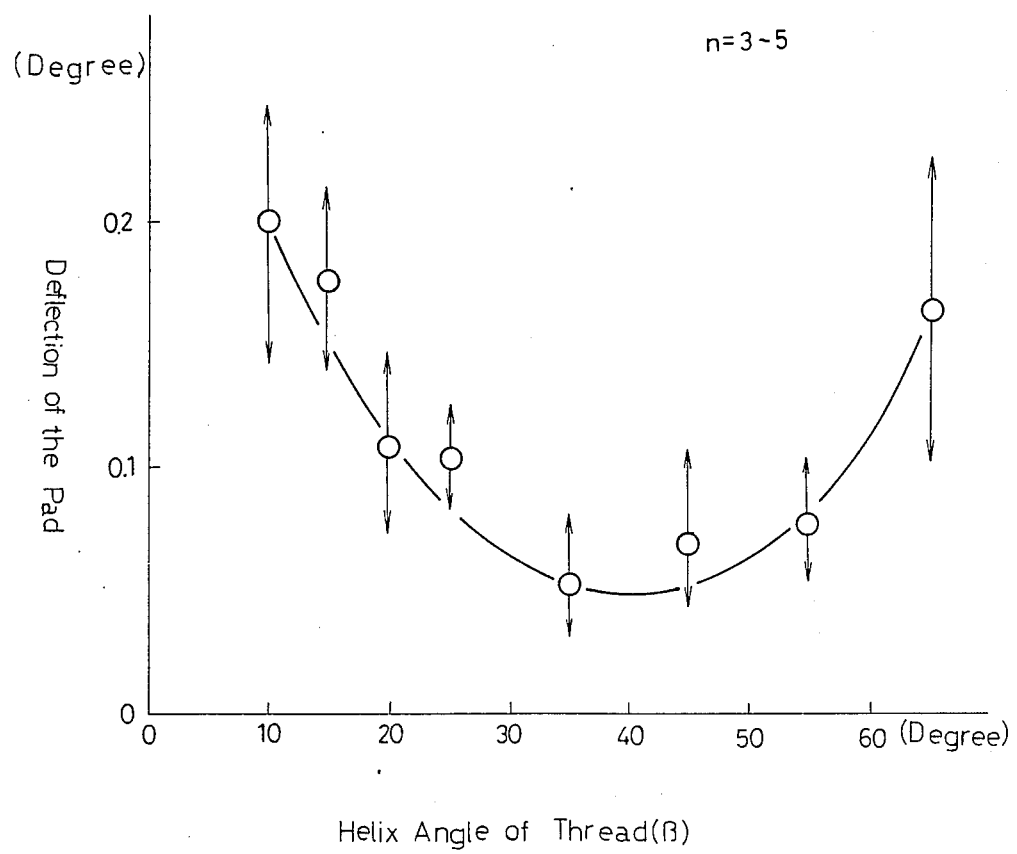
FIG. 14 is a graph showing the relation between helix angle of thread and deflection of a pad section in the fourth embodiment.

Further, the results shown in FIG. 14 were obtained from the steering wheels subjected to the foregoing test by reversing suddenly rotation of the ring 13 from clockwise to counterclockwise or vice versa, and measuring deflection of the pad section 1 at the time of reversal by the use of a non-contact type displacement sensor ( made by Reed Electric Works ). According to the graph of FIG. 14, it has become clear that when the thread helix angle $\beta$ falls within the range of 25° to 60°, the degree of deflection of the pad section 1 is small, not larger than 0.1° in average.

Further, it has also become clear that the range of 35° to 55° in thread helix angle $\beta$ is desirable in order to make the maximum value of deflection of the pad section 1 not larger than 0.1°.

Furthermore, a test of steering control was performed by ten male drivers of seven-year career with respect to these steering wheels to investigate the operability of steering and the degree of generation of abnormal noise at the time of steering control in terms of feeling. The results are listed in Table 1 and Table 2.

TABLE 1

| Helix angle β (degrees) | Smoothness |
|---|---|
| 10 | X~Δ |
| 15 | Δ |
| 20 | Δ |
| 25 | Δ~O |
| 35 | Δ~O |
| 45 | O |
| 55 | O |
| 65 | O |

In Table 1 above, symbol "" indicates that all the drivers answered "very smooth", symbol "Δ~" indicates that more than half answered "smooth", symbol "X~Δ" indicates that one-third answered "somewhat smooth", and symbol "X" indicates that all answered "not smooth".

TABLE 2

| Helix angle β (degree) | Abnormal noise |
|---|---|
| 10 | X~Δ |
| 15 | X~Δ |
| 20 | Δ |
| 25 | Δ~O |
| 35 | Δ~O |
| 45 | O |
| 55 | O |
| 65 | Δ~O |

In Table 2 above, symbol "" indicates that all answered "perfectly noiseless", symbol "Δ~" indicates that half answered "no generation of abnormal noise is sensed", symbol "X~Δ" indicates that one-third answered "abnormal noise is generated a little", and symbol "X" indicates that all answered "generation of abnormal noise is sensed".

Summarizing the results of experiment, the steering wheel comprising the pad-side sun gear 121a, column-side sun gear 121b, pad-side planetary gear 146a, column-side planetary gear 146b, and planetary gear 147; the thread helix angle β of these gears ranging from 25° to 60°, preferably from 35° to 55°, needs a small control torque, exhibits only a slight looseness on the pad section 1, and gives a low amount of abnormal noise.

In this fourth embodiment, the pad-side planetary gear 146a and the column-side planetary gear 146b may be urged so as to approach mutually toward the inside of the two parallel pins 106.

As described in detail hereinabove, according to this fourth embodiment, by setting the thread helix angle of the pad-side sun gear 121a, column-side sun gear 121b, padside planetary gear 146a, column-side planetary gear 146b, and planetary gear 147 of the helical gear type to a large value ranging from 25° to 60°, there are provided the superior effects that the control torque of steering control is reduced, generation of abnormal noise is suppressed, and backlash or looseness of the pad section 1 is suppressed.

As many different modifications may be made without departing from the spirit and scope of the present invention, it is not intended to have the present invention limited to the specific embodiments thereof, except as defined in the appended claims.

What is claimed is:
1. A steering wheel, comprising:
a non-rotatable column section;
a rotatable steering shaft having a longitudinal axis, said steering shaft passing axially through said column section and having an upper end portion;
a boss portion secured to the upper end portion of said steering shaft for rotation therewith;
a boss plate secured on said boss portion;
spoke means secured to and radiating outwardly from said boss plate;
a steering ring secured to said spoke means and arranged such that rotation of said steering ring effects corresponding rotation of said steering shaft;
a steering wheel pad axially superimposed upon said outer end of said upper end portion of said steering shaft;
a first sun gear of helical gear type mounted on said column section and journalled by bearing means with respect to said boss portion, so that said steering shaft, including said boss portion, may be rotated by rotation of said steering ring, about said longitudinal axis without requiring said first sun gear to rotate;
a second sun gear of helical gear type mounted on said steering wheel pad and journalled by bearing means with respect to said boss portion, so that said steering shaft, including said boss portion, may be rotated by rotation of said steering ring, about said longitudinal axis, without requiring said second sun gear and said steering wheel pad to rotate;
a plurality of planetary gear shafts arranged with respective longitudinal axes parallel to the longitudinal axis of said steering shaft; means mounting each planetary gear shaft on said boss plate; each planetary gear shaft having two opposite end portions, including one located radially beside said first planetary gear and another located radially beside said second sun gear;
a sun of planetary gear means pairs of helical gear type; each planetary gear means pair being mounted on a respective said planetary gear shaft so as to rotate therewith;
each said planetary gear means pair including:
a first planetary gear means disposed on said one end portion of the respective planetary gear shaft and in meshing engagement with said first sun gear, and
a second planetary gear means disposed on said other end portion of the respective planetary gear shaft and in meshing engagement with said second sun gear;
in at least one but less than all of said planetary gear means pairs, said first planetary gear means and said second planetary gear means being provided as separate planetary gears of helical gear type, at least one of which is mounted on the respective said planetary gear shaft by mounting means which permit the respective at least one planetary gear to move axially, to a limited extent, so that said planetary gears are relatively axially movable towards and away from one another on the respective said planetary gear shaft; and
resilient means associated with said planetary gear shaft of said one planetary gear means pair and resiliently engaging said at least one planetary gear for resiliently tending to move said at least one planetary gear axially to a limited extent for thereby taking-up play in a mechanical linkage constituted by the first planetary gear meshed with the first sun gear, the planetary gear shaft on which the first and second planetary gears are mounted, and the second planetary gear meshed with the second sun gear.

2. The steering wheel of claim 1, wherein:
said resilient means is arranged to resiliently tend to move said first and second planetary gears axially away from one another.

3. The steering wheel of claim 1, wherein:
for each said planetary gear shaft, said mounting means comprises a pair of laterally spaced, longitudinally and radially extending side frames, securement means securing said side frames to said boss plate, and a pair of longitudinally spaced end frames extending between and secured to said side frames, each end frame including a bearing means, each said planetary gear shaft being housed by respective side frames and end frames, and journalled in respective said bearing means of the respective said planetary gear shaft mounting means.

4. The steering wheel of claim 1, wherein:
said resilient means comprises a coil spring fitted around the respective said planetary gear shaft and engaged with confronting faces of said first and second planetary gears.

5. The steering wheel of claim 1, wherein:
said sun gears and said planetary gears have respective corresponding thread helix angles in the range of 25° to 60°.

* * * * *

UNITED STATES PATENT AND TRADEMARK OFFICE
CERTIFICATE OF CORRECTION

PATENT NO. : 4,796,482
DATED : January 10, 1989
INVENTOR(S) : Tetsushi Hiramitsu, Satoshi Ono . .. .

It is certified that error appears in the above-identified patent and that said Letters Patent is hereby corrected as shown below:

<u>IN COLUMN 14 OF CLAIM ONE</u>.

Please change:

In column 14, Lines 15-16 "said outer end" to --an outer end--.

In column 14, Line 38 "planetary" to --sun--.

In column 14, Line 40 "a sun of" to --a plurality of".

Signed and Sealed this

Twenty-fifth Day of July, 1989

*Attest:*

DONALD J. QUIGG

*Attesting Officer*  *Commissioner of Patents and Trademarks*